(12) United States Patent
He

(10) Patent No.: US 11,231,624 B2
(45) Date of Patent: Jan. 25, 2022

(54) PIXEL STRUCTURE, DISPLAY PANEL AND DISPLAY DEVICE

(71) Applicant: HKC Corporation Limited, Shenzhen (CN)

(72) Inventor: Huai Liang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/958,833

(22) PCT Filed: Feb. 7, 2018

(86) PCT No.: PCT/CN2018/075535
§ 371 (c)(1),
(2) Date: Jun. 29, 2020

(87) PCT Pub. No.: WO2019/148513
PCT Pub. Date: Aug. 8, 2019

(65) Prior Publication Data
US 2021/0072602 A1    Mar. 11, 2021

(30) Foreign Application Priority Data

Feb. 1, 2018  (CN) .......................... 201810101119.6

(51) Int. Cl.
*G02F 1/1343* (2006.01)
*G02F 1/1335* (2006.01)
*G02F 1/1368* (2006.01)

(52) U.S. Cl.
CPC ...... *G02F 1/134309* (2013.01); *G02F 1/1368* (2013.01); *G02F 1/13439* (2013.01); *G02F 1/133514* (2013.01); *G02F 1/134345* (2021.01)

(58) Field of Classification Search
None
See application file for complete search history.

(56) References Cited

U.S. PATENT DOCUMENTS

2003/0071952 A1*  4/2003  Yoshida ................ G02F 1/1393
349/141
2007/0013848 A1*  1/2007  Hsu ....................... G02F 1/1393
349/129

(Continued)

FOREIGN PATENT DOCUMENTS

CN    101089682 A    12/2007
CN    102360141 A    2/2012

(Continued)

*Primary Examiner* — Shan Liu
(74) *Attorney, Agent, or Firm* — WPAT, PC

(57) ABSTRACT

A pixel structure, a display panel and a display device are provided. The pixel structure includes a first electrode layer and a second electrode layer. The first electrode layer includes a first plate-shaped electrode and first strip-shaped electrodes; the first strip-shaped electrodes include at least two first strip-shaped structures, and each adjacent two of the first strip-shaped structures have a first slit formed therebetween; the second electrode layer includes a second plate-shaped electrode and second strip-shaped electrodes, wherein the second strip-shaped electrodes include at least two second strip-shaped structures, and each adjacent two of the second strip-shaped structures have a second slit formed therebetween.

18 Claims, 3 Drawing Sheets

(56) References Cited

U.S. PATENT DOCUMENTS

| | | | | |
|---|---|---|---|---|
| 2009/0079892 A1* | 3/2009 | Hsien | ................ | G02F 1/133707 349/47 |
| 2010/0097535 A1* | 4/2010 | Inoue | ................ | G02F 1/133707 349/38 |
| 2016/0195783 A1* | 7/2016 | Song | ................ | G02F 1/134309 349/143 |

FOREIGN PATENT DOCUMENTS

| | | |
|---|---|---|
| CN | 104808402 A | 7/2015 |
| CN | 208156378 U | 11/2018 |

\* cited by examiner

PIXEL STRUCTURE, DISPLAY PANEL AND DISPLAY DEVICE

FIELD OF THE DISCLOSURE

The present application relates to the technical field of liquid crystal display, and more particularly to a pixel structure, a display panel and a display device.

BACKGROUND

At present, market's requirements on the performances of liquid crystal displays include characteristics of high contrast ratio, no gray scale inversion, little color shift, high luminance, high color richness, high color saturation, quick response, wide viewing angle, and the like. Currently, technologies capable of achieving the requirement of the wide viewing angle include, for example, twisted nematic (TN) liquid crystal plus wide viewing film liquid crystal displays, in-plane switching (IPS) liquid crystal displays, fringe field switching liquid crystal displays and multi-domain vertically alignment (MVA) thin film transistor liquid crystal displays, and the like.

In terms of the existing MVA liquid crystal displays, the alignment protrusions or slits configured on a color filter substrate or a thin film transistor array substrate can cause liquid crystal molecules to be arranged in multiple directions to obtain several different alignment domains, therefore, the MVA liquid crystal displays can achieve the requirement of wide viewing angle. In prior art, pixel structures used by the MVA liquid crystal displays may easily cause a problem of color washout. In order to solve the problem of color washout, the alignment domains in the pixel structures are usually increased, for example, the alignment domains are increased to eight from four. However, the increase of the alignment domains will affect a transmittance of the display panel and a display quality is reduced.

SUMMARY

The present application provides a pixel structure with higher transmittance, a display panel and a display device.

In one aspect, an embodiment of the present application provides a pixel structure, the pixel structure includes data lines; scan lines, disposed perpendicular to the data lines, wherein the data lines and the scan lines together enclose a region to form a pixel area, and a plurality of pixel areas are arranged on the display panel in a matrix form; a switch element, electrically connected to the data lines and the scan lines; a first electrode layer, disposed on a first substrate of the display panel and including a first plate-shaped electrode and first strip-shaped electrodes, wherein the first strip-shaped electrodes include at least two first strip-shaped structures, and each adjacent two of the first strip-shaped structures have a first slit formed therebetween; the first plate-shaped electrode is located in a first area, and the first strip-shaped electrodes and the first slits are located in second areas; a second electrode layer, disposed on a second substrate opposite to the first substrate and including a second plate-shaped electrode and second strip-shaped electrodes, wherein the second strip-shaped electrodes include at least two second strip-shaped structures, and each adjacent two of the second strip-shaped structures have a second slit formed therebetween; the second strip-shaped electrodes and the second slits are located in a third area, and the second plate-shaped electrodes are located in fourth areas; the second areas and the fourth areas are disposed oppositely and are equal in area, and the first area and the third area are disposed oppositely and are equal in area; and each of areas of the first electrode layer and the second electrode layer is less than or equal to an area of the pixel area.

In another aspect, an embodiment of the present application provides a display panel including a first substrate, a second substrate and a liquid crystal layer, wherein the display panel further includes pixel structures, and each of the pixel structures includes data lines; scan lines, disposed perpendicular to the data lines, wherein the data lines and the scan lines together enclose a region to form a pixel area, and a plurality of the pixel areas are arranged on the display panel in a matrix form; a switch element, electrically connected to one of the data lines and one of the scan lines; a first electrode layer, disposed on a first substrate of the display panel and including a first plate-shaped electrode and first strip-shaped electrodes, wherein the first strip-shaped electrodes include at least two first strip-shaped structures, and each adjacent two of the first striped structures have a first slit formed therebetween; the first plate-shaped electrode is located in a first area, and the first strip-shaped electrodes and the first slits are located in second areas; and a second electrode layer, disposed on a second substrate opposite to the first substrate and including second plate-shaped electrode and second strip-shaped electrodes, wherein the second strip-shaped electrodes include at least two second strip-shaped structures, and each adjacent two of the second strip-shaped structures have a second slit formed therebetween; the second strip-shaped electrodes and the second slits are located in a third area, and the second plate-shaped electrodes are located in fourth areas; and wherein the second areas and the fourth areas are disposed oppositely and are equal in area, and the first area and the third area are disposed oppositely and are equal in area; and each of areas of the first electrode layer and the second electrode layer is less than or equal to an area of the pixel area.

In another aspect, an embodiment of the present application provides a display device including a shell and a display panel fixed in the shell, wherein the display panel includes a first substrate, a second substrate, a liquid crystal layer and pixel structures, and each of the pixel structures includes: data lines; scan lines, disposed perpendicular to the data lines, wherein the data lines and the scan lines together enclose a region to form a pixel area, and a plurality of the pixel areas are arranged on the display panel in a matrix form; a switch element, electrically connected to one of the data lines and one of the scan lines; a first electrode layer, disposed on a first substrate of the display panel and including a first plate-shaped electrode and first strip-shaped electrodes, wherein the first strip-shaped electrodes include at least two first strip-shaped structures, and each adjacent two of the first strip-shaped structures have a first slit formed therebetween; an area where the first plate-shaped electrode is located is a first area, and areas where the first strip-shaped electrodes and the first slits are located are second areas; and a second electrode layer, disposed on a second substrate opposite to the first substrate and including second plate-shaped electrodes and second strip-shaped electrodes, wherein the second strip-shaped electrodes include at least two second strip-shaped structures, and each adjacent two of the second strip-shaped structures have a second slit formed therebetween; an area where the second strip-shaped electrodes and the second slits are located is a third area, and areas where the second plate-shaped electrodes are located are fourth areas; and wherein the first strip-shaped structures and the second strip-shaped structures extend in at least two extending angles, and widths of the first strip-shaped structures are equal to width of the second strip-shaped structures; the second areas and the fourth areas are disposed oppositely and are equal in area, and the first area and the third area are disposed oppositely and are equal in area; and each of areas of the first electrode layer and the second electrode layer is less than or equal to an area of the pixel area.

According to the embodiment of the present application, the electrode layers including the strip-shaped structures are respectively disposed on the first substrate and the second substrate in the display panel, to control an arrangement direction of liquid crystal molecules in the display panel, and further different alignment domains are obtained to achieve a wide viewing angle effect of the display panel. Meanwhile, the pixel structure is favorable for improving a transmittance of the display panel and enhancing display quality.

BRIEF DESCRIPTION OF THE DRAWINGS

In order to explain the technical solutions of embodiments of the present application more clearly, the drawings required in description of the embodiments will be briefly introduced. It is obvious that the drawings described below are some embodiments of the present disclosure, and those ordinary skilled in the art can obtain other drawings according to these drawings, without paying any inventive work.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

Figure 1:
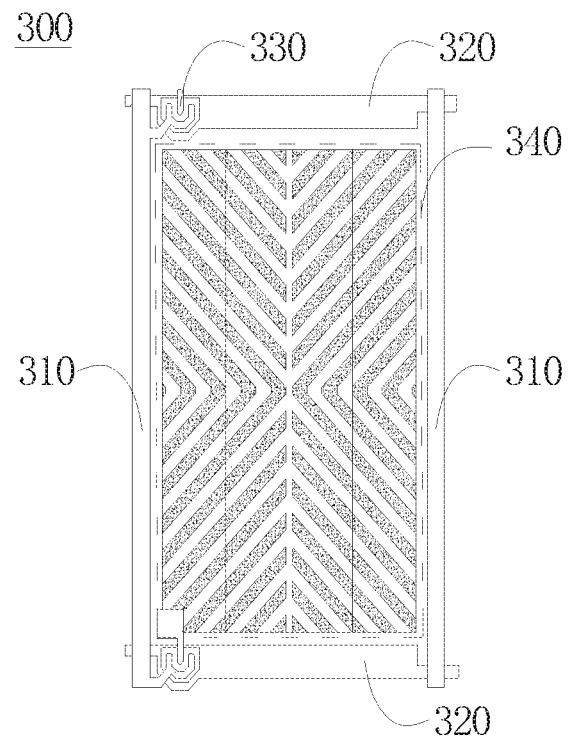
FIG. 1 is a structural schematic view of a pixel structure in an embodiment of the present application.
Figure 2:
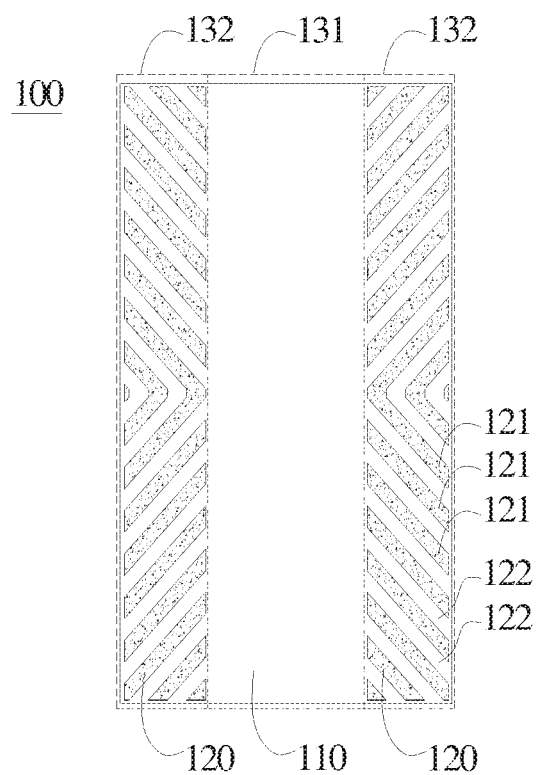
FIG. 2 is a structural schematic view of a first electrode layer in a pixel structure in an embodiment of the present application.
Figure 3:
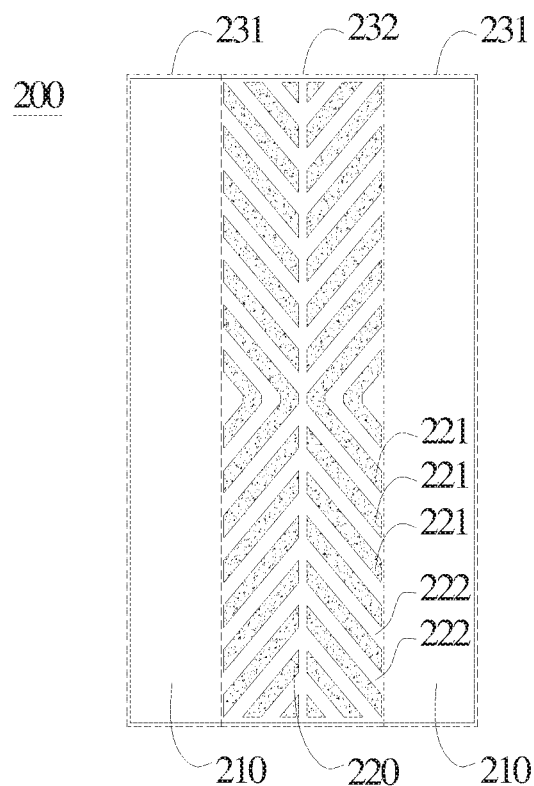
FIG. 3 is a structural schematic view of a second electrode layer in a pixel structure in an embodiment of the present application.

Referring to FIGS. 1 to 3, the pixel structure 300 includes data lines 310, scan lines 320, a switch element 330, a first electrode layer 100 and a second electrode layer 200.

The data lines 310 are perpendicular to the scan lines 320. The two data lines 310 and the two scan lines 320 as shown in FIG. 1 together form a pixel area 340 which is enclosed by the data lines 310 and the scan lines 320. The pixel area 340 is repeatedly arranged on a display panel in a matrix form. The switch element 330 is electrically connected to the data line 300 and the scan line 320.

In a specific embodiment, the data lines 310, the scan lines 320 and the switch element 330 may be disposed on a first substrate or a second substrate of the display panel. The data lines 310 each extend along a horizontal direction, and the scan lines 320 each extend a vertical direction. The switch element 330 may be a thin film transistor (TFT), but not limited thereto. A gate electrode of the thin film transistor is connected to the scan line 320, a source electrode of the thin film transistor is connected to the data line 310 and a drain electrode of the thin film transistor is connected to a pixel electrode.

The first electrode layer 100 is disposed on the first substrate of the display panel and includes a first plate-shaped electrode (i.e., a continuous electrode) 110 and first strip-shaped electrodes 120. The first strip-shaped electrodes 120 include at least two first strip-shaped structures 121, and each adjacent two of the first strip-shaped structures 121 have a first slit 122 formed therebetween. An area where the first plate-shaped electrode 110 is located is a first area 131, and areas where all the first strip-shaped electrodes 120 and all the first slits 122 are located are second areas 132. Moreover, as seen from FIG. 2, the first strip-shaped electrodes 120 are located at two sides of the first plate-shaped electrode 110.

The second electrode layer 200 is disposed on the second substrate opposite to the first substrate and includes second plate-shaped electrodes 210 (i.e., each is a continuous electrode) and second strip-shaped electrodes 220. The second strip-shaped electrodes 220 include at least two second strip-shaped structures 221, and each adjacent two of the second strip-shaped structures 221 have a second slit 222 formed therebetween. An area where all the second strip-shaped electrodes 220 and all the second slits 222 are located is a third area 232, and areas where the second plate-shaped electrodes are located are fourth areas 231.

The second areas 132 and the fourth areas 231 are aligned and disposed oppositely and are equal in area, and the first area 131 and the third areas 232 are aligned and disposed oppositely and are equal in area. Each of the areas of the first electrode layer and the second electrode layer is less than or equal to an area of the pixel area.

In the embodiment of the present application, the display panel includes but not limited to a liquid crystal display (LCD) panel, an organic light-emitting diode (OLED) display panel, a field emission display (FED) panel, a plasma display panel (PDP) and a curve surface panel. The liquid crystal panel includes a thin film transistor-liquid crystal display (TFT-LCD) panel, a twisted nematic (TN)+film panel, a vertical alignment panel, an in plane switching (IPS) panel, a color filter on array (COA) panel, etc.

The display panel is the liquid crystal display (LCD) panel. The first substrate is an array substrate (ARRAY), and the second substrate is a color filter (CF) substrate opposite to the first substrate. Or, the first substrate is the CF substrate and the second substrate is the array substrate (ARRAY). If the first substrate is the array substrate (ARRAY) and the second substrate is the CF substrate opposite to the first substrate, the first electrode layer 100 disposed on the first substrate serves as a pixel electrode in the pixel structure 300, and the second electrode layer 200 disposed on the second substrate serves as a common electrode in the pixel structure 300. A voltage difference may be formed between the first electrode layer 100 and the second electrode layer 200 to drive liquid crystal molecules in the display panel.

In specific implementation, the areas of the second areas 132 and the fourth areas 231 may be adjusted according to a debugging result of actual production, and further a better area ratio for improving a problem of color washout of the display panel can be obtained. For example, an area ratio of the second areas 132 to the fourth areas 231 is 1:1, that is, the second areas 132 and the fourth areas 231 are disposed oppositely and are equal in area. Correspondingly, an area ratio of the first area 131 to the third area 232 is also 1:1, that is, the first area 131 and the third area 232 are disposed oppositely and are equal in area. Particularly, an area of the first area 131 is equal to the sum of areas of the second areas 132, and an area of the third area 232 is equal to the sum of areas of the fourth areas 231.

In some embodiments, the area ratio of the second areas 132 to the fourth areas 231 may also be 1:2, and correspondingly, the first area 131 to the third area 232 is 2:1. The embodiment of the present application does not limit the area ratio of the second areas 132 to the fourth areas 231.

In some embodiments, the first electrode layer 100 and the second electrode layer 200 may be made of a transparent conductive material such as an indium tin oxide and an indium zinc oxide. By the transmittance property of the materials such as an indium tin oxide and an indium zinc oxide, an aperture rate of the pixel structure 300 can be greatly improved, and a transmittance of the display panel is enhanced. The present application does not limit the materials of the first electrode layer 100 and the second electrode layer 200.

In some embodiments, the first electrode layer 100 and the second electrode layer 200 are respectively disposed on two opposite substrates, and both of them overlap with each other and are located in the pixel area 340.

In some embodiments, the first strip-shaped structures 121 and the second strip-shaped structures 221 both extend in at least two extending angles. For example, the first strip-shaped structures 121 and the second strip-shaped structures 221 both extend in four extending angles, and the extending angles include 45 degrees, 135 degrees, 225 degrees and 315 degrees. The extending angles are included angles between the first strip-shaped structures 121 and the scan lines 320 and between the second strip-shaped structures 221 and the scan lines 320.

In some embodiments, the pixel area 340 includes at least two pixel subareas, and an amount of the pixel subareas is equal to an amount of the extending angles. In a same one of the pixel subareas, an extending angle of the first strip-shaped structures 121 is equal to an extending angle of the second strip-shaped structures 221. For example, assuming that the extending angles include four angles of 45 degrees, 135 degrees, 225 degrees and 315 degrees, then the pixel area 340 can be divided into four pixel subareas. By the different pixel subareas formed by the strip-shaped structures at different extending angles, when a voltage difference is formed between the first substrate and the second substrate, a long axis of liquid crystal molecules may fall to the directions inclined for 45 degrees, 135 degrees, −45 degrees and −135 degrees relative to the horizontal direction.

In some embodiments, widths of the first strip-shaped structures 121 are equal to widths of the second strip-shaped structures 221. Widths of the first slits 122 are equal to widths of the second slits 222. The widths of the first strip-shaped structures 121 are equal to the widths of the first slits 122, and the widths of the second strip-shaped structures 221 are equal to the widths of the second slits 222. For example, the widths of the first strip-shaped structures 121 are 3 micrometers. Correspondingly, the widths of the second strip-shaped structures 220 are also 3 micrometers. The embodiment of the present application does not limit the widths of the first strip-shaped structures 121, the widths of the second strip-shaped structures 221, the widths of the first slits 122 and the widths of the second silts 222.

According to the embodiment of the present application, the electrode layers including the strip-shaped structures are respectively disposed on the first substrate and the second substrate in the display panel, to control an arrangement direction of liquid crystal molecules in the display panel, and further different alignment domains are obtained to realize a wide viewing angle effect of the display panel. Meanwhile, the pixel structure 300 is favorable for improving a transmittance of the display panel and enhancing a display quality.

Figure 4:
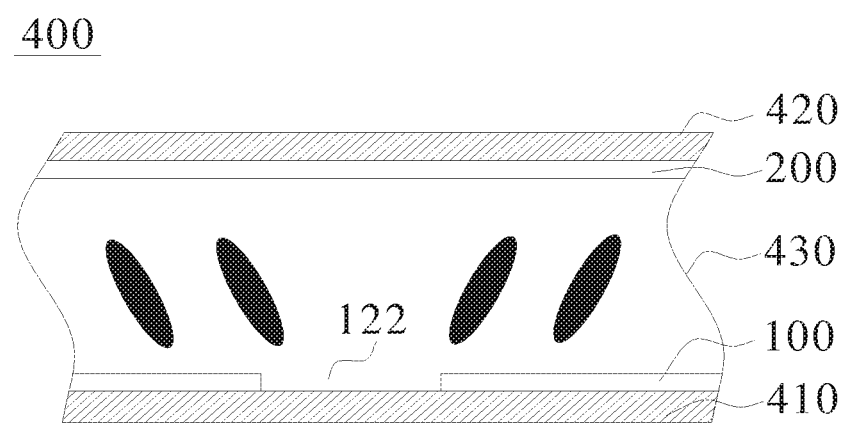
FIG. 4 is a structural schematic view of a display panel in an embodiment of the present application.

Referring to FIG. 4, FIG. 4 is a structural schematic view of a display panel in the embodiment of the present application. The display panel 400 includes a first substrate 410, a second substrate 420, a liquid crystal layer 430 and pixel structures 300.

In the embodiment of the present application, the display panel includes but not limited to a liquid crystal display (LCD) panel, an organic light-emitting diode (OLED) display panel, a field emission display (FED) panel, a plasma display panel (PDP) and a curve surface panel. The liquid crystal panel includes a thin film transistor-liquid crystal display (TFT-LCD) panel, a twisted nematic (TN)+film panel, a vertical alignment panel, an in plane switching (IPS) panel, a color filter on array (COA) panel, etc.

Specifically, in combination with FIGS. 1 to 3, the pixel structure 300 may be any pixel structure 300 provided in the foregoing embodiments and is not repeated herein.

Figure 5:
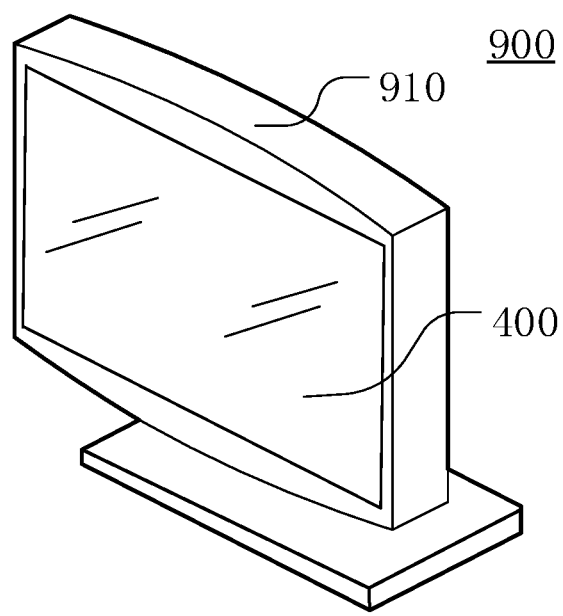
FIG. 5 is a structural schematic view of a display device in an embodiment of the present application.

Referring to FIG. 5, FIG. 5 is a structural schematic view of a display device in the embodiment of the present application. The display device 900 may be any product or part having a display function, such as a mobile phone, a tablet computer, a television, a display, a laptop, a digital photo frame, a navigator, etc. The display device 900 includes a shell 910 and the display panel 400 fixed in the shell 910. The display panel 400 includes the first substrate 410, the second substrate 420, the liquid crystal layer 430 and the pixel structures 300.

Specifically, in combination with FIGS. 1 to 4, the display panel 400 may be any display panel provided in the foregoing embodiments. The pixel structure 300 may be any pixel structure provided in the foregoing embodiments and is not repeated herein.

In the foregoing embodiments, there are particular emphases on description of respective embodiments, and certain part that is not described in detail in certain embodiment may refer to related description in other embodiments.

The sequence of steps in the method of the embodiment of the present application may be adjusted, merged and deleted according to actual needs.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A pixel structure, disposed on a display panel; wherein the pixel structure comprises
   data lines;

scan lines, disposed perpendicular to the data lines, wherein the data lines and the scan lines together enclose a region to form a pixel area, and a plurality of the pixel areas are arranged on the display panel in a matrix form;

a switch element, electrically connected to one of the data lines and one of the scan lines;

a first electrode layer, disposed on a first substrate of the display panel and comprising a first plate-shaped electrode and first strip-shaped electrodes, wherein the first strip-shaped electrodes comprise at least two first strip-shaped structures, and each adjacent two of the first strip-shaped structures have a first slit formed therebetween; the first plate-shaped electrode is located in a first area of which a lengthwise direction is along an extending direction of the one of the data lines, and the first strip-shaped electrodes and the first slits are located in two second areas each of which a lengthwise direction is along the extending direction of the one of the data lines, wherein the two second areas are juxtaposed with the first area in an extending direction of the one of the scan lines and respectively located at two opposite sides of the first area; and a second electrode layer, disposed on a second substrate opposite to the first substrate and comprising second plate-shaped electrodes and second strip-shaped electrodes, wherein the second strip-shaped electrodes comprise at least two second strip-shaped structures, and each adjacent two of the second strip-shaped structures have a second slit formed therebetween; the second strip-shaped electrodes and the second slits are located in a third area of which a lengthwise direction is along the extending direction of the one of the data lines, and the second plate-shaped electrodes are located in two fourth areas each of which a lengthwise direction is along the extending direction of the one of the data lines, wherein the two fourth areas are juxtaposed with the third area in the extending direction of the one of the scan lines and respectively located at two opposite sides of the third area; and wherein the two second areas and the two fourth areas are disposed oppositely in the pixel area and are equal in area, and the first area and the third area are disposed oppositely in the pixel area and are equal in area; and each of areas of the first electrode layer and the second electrode layer is less than or equal to an area of the pixel area;

wherein the first strip-shaped structures and the second strip-shaped structures extend in at least two extending angles with respect to the scan lines;

wherein the first strip-shaped structures and the second strip-shaped structures specifically extend in four extending angles, and the extending angles comprise 45 degrees, 135 degrees, 225 degrees and 315 degrees; wherein all of the strip-shaped structures in one of the two second areas extend in the extending angles 45 degrees and 315 degrees, and all of the strip-shaped structures in the other of the two second areas extend in the extending angles of 135 degrees and 225 degrees.

2. The pixel structure according to claim 1, wherein the pixel area comprises at least two pixel subareas, and an amount of the pixel subareas is equal to an amount of the extending angles.

3. The pixel structure according to claim 2, wherein in a same one of the pixel subareas, the extending angle of the first strip-shaped structures is equal to the extending angle of the second strip-shaped structures.

4. The pixel structure according to claim 1, wherein widths of the first strip-shaped structures are equal to widths of the second strip-shaped structures.

5. The pixel structure according to claim 1, wherein a width of the first slit is equal to a width of the second slit.

6. The pixel structure according to claim 1, wherein widths of the first strip-shaped structures are equal to a width of the first slit, and widths of the second strip-shaped structures are equal to a width of the second slit.

7. The pixel structure according to claim 1, wherein widths of the first strip-shaped structures and widths of the second strip-shaped structures each are 3 micrometers.

8. The pixel structure according to claim 1, wherein an area of the first area is equal to the sum of areas of the two second areas.

9. The pixel structure according to claim 1, wherein an area of the third area is equal to the sum of areas of the two fourth areas.

10. The pixel structure according to claim 1, wherein the display panel is a liquid crystal panel.

11. The pixel structure according to claim 1, wherein the data lines, the scan lines and the switch element are disposed on the first substrate.

12. The pixel structure according to claim 11, wherein the switch element is a thin film transistor.

13. The pixel structure according to claim 1, wherein the second substrate is a color filter substrate.

14. The pixel structure according to claim 1, wherein the first electrode layer and the second electrode layer are made of a transparent conductive material.

15. The pixel structure according to claim 14, wherein the transparent conductive material is an indium tin oxide.

16. The pixel structure according to claim 14, wherein the transparent conductive material is an indium zinc oxide.

17. A display panel comprising a first substrate, a second substrate and a liquid crystal layer, wherein the display panel further comprises pixel structures, and each of the pixel structures comprises data lines;

scan lines, disposed perpendicular to the data lines, wherein the data lines and the scan lines together enclose a region to form a pixel area, and a plurality of the pixel areas are arranged on the display panel in a matrix form;

a switch element, electrically connected to one of the data lines and one of the scan lines;

a first electrode layer, disposed on a first substrate of the display panel and comprising a first plate-shaped electrode and first strip-shaped electrodes, wherein the first strip-shaped electrodes comprise at least two first strip-shaped structures, and each adjacent two of the first strip-shaped structures have a first slit formed therebetween; the first plate-shaped electrode is located in a first area of which a lengthwise direction is along an extending direction of the one of the data lines, and the first strip-shaped electrodes and the first slits are located in two second areas each of which a lengthwise direction is along the extending direction of the one of the data lines, wherein the two second areas are arranged side-by-side with the first area in an extending direction of the one of the scan lines and respectively located at two opposite sides of the first area; and a second electrode layer, disposed on a second substrate opposite to the first substrate and comprising second plate-shaped electrodes and second strip-shaped electrodes, wherein the second strip-shaped electrodes comprise at least two second strip-shaped structures, and each adjacent two of the second strip-shaped structures have a second slit formed therebetween; the second strip-shaped electrodes and the second slits are located in a third area of which a lengthwise direction is along the extending direction of the one of the data lines, and the second plate-shaped electrodes are located in two fourth areas each of which a lengthwise direction is along the extending direction of the one of the data lines, wherein the two fourth areas are arranged side-by-side with the third area in the extending direction of the one of the scan lines and respectively located at two opposite sides of the third area; and wherein the two second areas and the two fourth areas are disposed oppositely in the pixel area and are equal in area, and the first area and the third area are disposed oppositely in the pixel area and are equal in area; and each of areas of the first electrode layer and the second electrode layer is less than or equal to an area of the pixel area;

wherein the first strip-shaped structures and the second strip-shaped structures extend in four extending angles with respect to the scan lines, and the extending angles comprise 45 degrees, 135 degrees, 225 degrees and 315 degrees; wherein the strip-shaped structures in one of the two second areas extend in the extending angles 45 degrees and 315 degrees, and the strip-shaped structures in the other of the two second areas extend in the extending angles of 135 degrees and 225 degrees.

18. A display device comprising a shell and a display panel fixed in the shell, wherein the display panel comprises a first substrate, a second substrate, a liquid crystal layer and pixel structures, and each of the pixel structures comprises:

data lines;

scan lines, disposed perpendicular to the data lines, wherein the data lines and the scan lines together enclose a region to form a pixel area, and a plurality of the pixel areas are arranged on the display panel in a matrix form;

a switch element, electrically connected to one of the data lines and one of the scan lines;

a first electrode layer, disposed on a first substrate of the display panel and comprising a first plate-shaped electrode and first strip-shaped electrodes, wherein the first strip-shaped electrodes comprise at least two first strip-shaped structures, and each adjacent two of the first strip-shaped structures have a first slit formed therebetween; an area where the first plate-shaped electrode is located is a first area of which a lengthwise direction is along an extending direction of the one of the data lines, and areas where the first strip-shaped electrodes and the first slits are located are two second areas each of which a lengthwise direction is along the extending direction of the one of the data lines, wherein the two second areas are juxtaposed with the first area in an extending direction of the one of the scan lines and respectively located at two opposite sides of the first area; and a second electrode layer, disposed on a second substrate opposite to the first substrate and comprising second plate-shaped electrodes and second strip-shaped electrodes, wherein the second strip-shaped electrodes comprise at least two second strip-shaped structures, and each adjacent two of the second strip-shaped structures have a second slit formed therebetween; an area where the second strip-shaped electrodes and the second slits are located is a third area of which a lengthwise direction is along the extending direction the one of the data lines, and areas where the second plate-shaped electrodes are located are two fourth areas each of which a lengthwise direction is along the extending direction of the one of the data lines, wherein the two fourth areas are juxtaposed with the third area in the extending direction of the one of the scan lines and respectively located at two opposite sides of the third area; and wherein the first strip-shaped structures and the second strip-shaped structures extend in at least two extending angles, and widths of the first strip-shaped structures are equal to widths of the second strip-shaped structures; the two second areas and the two fourth areas are disposed oppositely in the pixel area and are equal in area, and the first area and the third area are disposed oppositely in the pixel area and are equal in area; and each of areas of the first electrode layer and the second electrode layer is less than or equal to an area of the pixel area.

\* \* \* \* \*